United States Patent
Chang et al.

(10) Patent No.: US 7,264,757 B2
(45) Date of Patent: Sep. 4, 2007

(54) CONTROLLABLE MICROSCOPIC BUBBLE NUCLEATION IN FLUID POLYMER MATERIAL PRODUCTION METHOD AND ITS APPARATUS

(75) Inventors: Chien-Tsung Chang, Changhua (TW); David William Hind, Ashfield (GB)

(73) Assignee: Everfocus Worldwide Co., Ltd., Tortola (VG)

( * ) Notice: Subject to any disclaimer, the term of this patent is extended or adjusted under 35 U.S.C. 154(b) by 535 days.

(21) Appl. No.: 10/787,212

(22) Filed: Feb. 27, 2004

(65) Prior Publication Data

US 2005/0189667 A1    Sep. 1, 2005

(51) Int. Cl.
*B29C 44/20* (2006.01)
*B29C 44/34* (2006.01)

(52) U.S. Cl. .................. 264/50; 425/4 C; 425/207; 425/208

(58) Field of Classification Search .............. 264/50, 264/53; 425/207, 208, 4 C
See application file for complete search history.

(56) References Cited

U.S. PATENT DOCUMENTS 3,986,709 A * 10/1976 Vermeulen .................. 366/90
6,949,208 B1 * 9/2005 Kawauchi et al. ............ 264/50

* cited by examiner

*Primary Examiner*—Allan R. Kuhns
(74) *Attorney, Agent, or Firm*—Troxell Law Office, PLLC

(57) ABSTRACT

A controllable microscopic bubble nucleation in fluid polymer material production method and apparatus utilizing a gas pipe disposed in the conveyance screw shaft of an injection or extraction forming mechanism and a microbubble generating component, such as a microscopic perforation vented metal head or a microscopic perforation ceramic head, installed at the front extremity of the conveyance screw shaft. At the rear extremity of the gas pipe, a pressurization pump or a high pressure gas storage tank is admitted from an air intake opening, enabling the gas to be indirectly heated by an electric heater on the materials pipe. The high temperature gas is thereafter outputted from the microscopic perforations of the microbubble generating component such that high temperature microscopic bubbles are directly admitted into the section of liquid polymer material which is then uniformly amalgamated by the conveyance screw shaft and then deposited into a forming die.

11 Claims, 4 Drawing Sheets

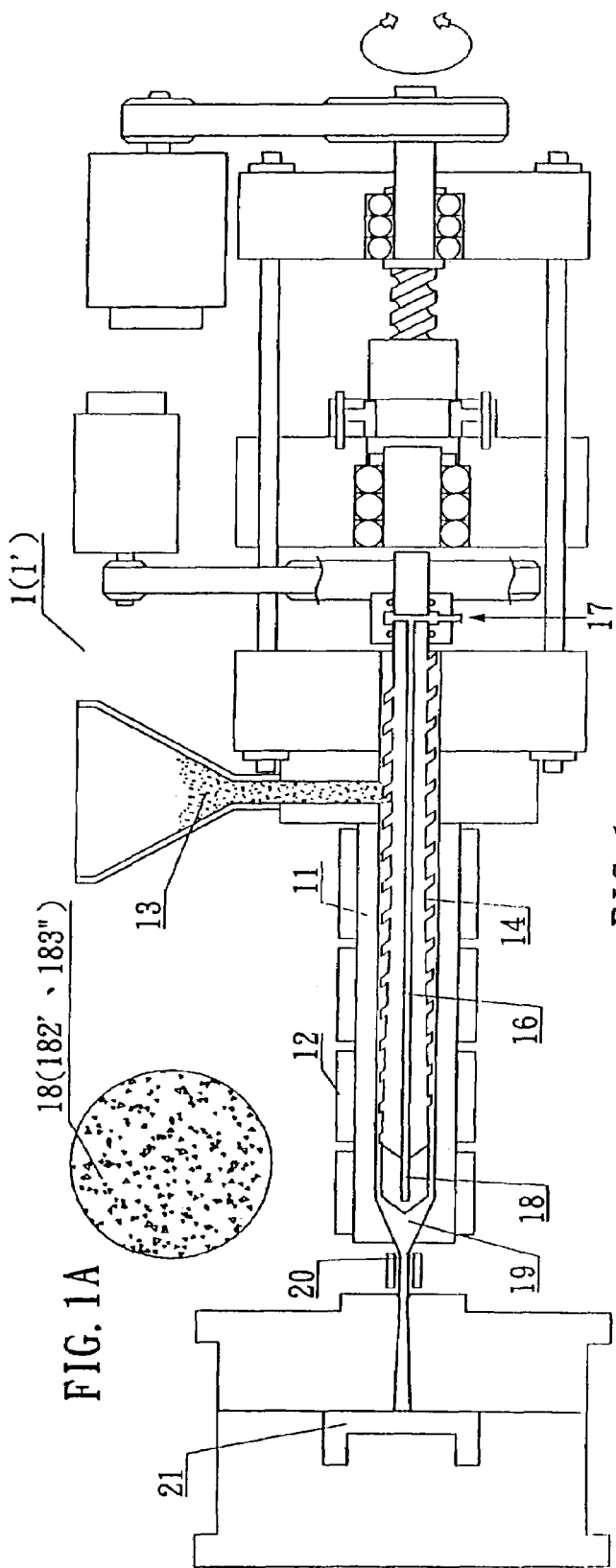
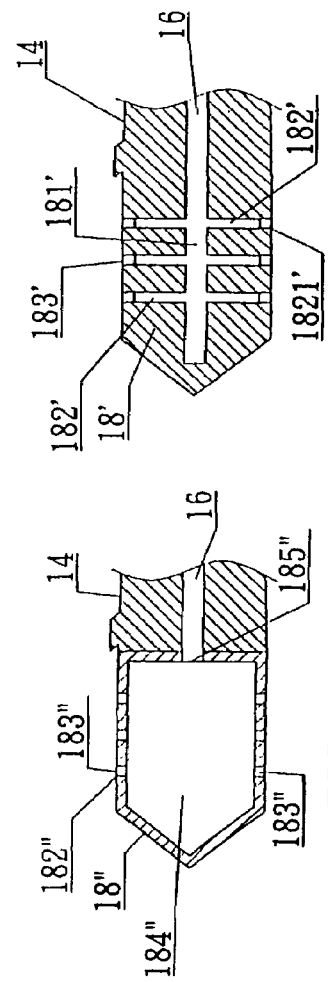
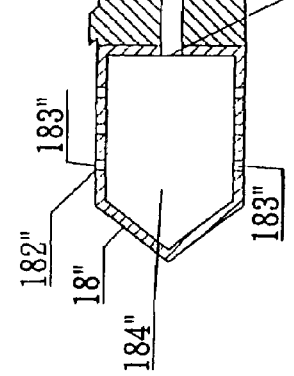
FIG. 1
FIG. 1A
FIG. 1B
FIG. 1C

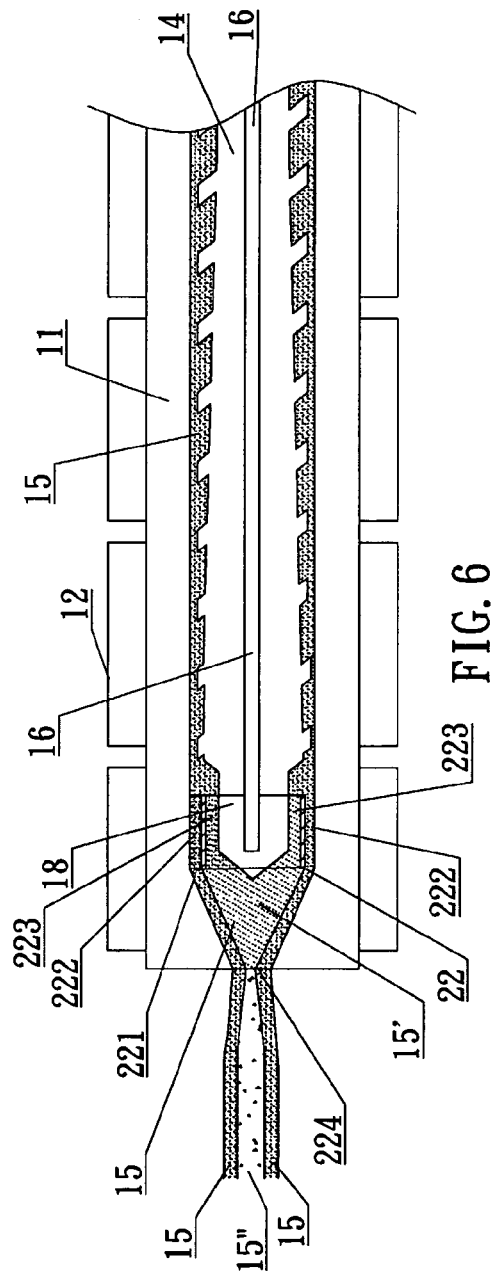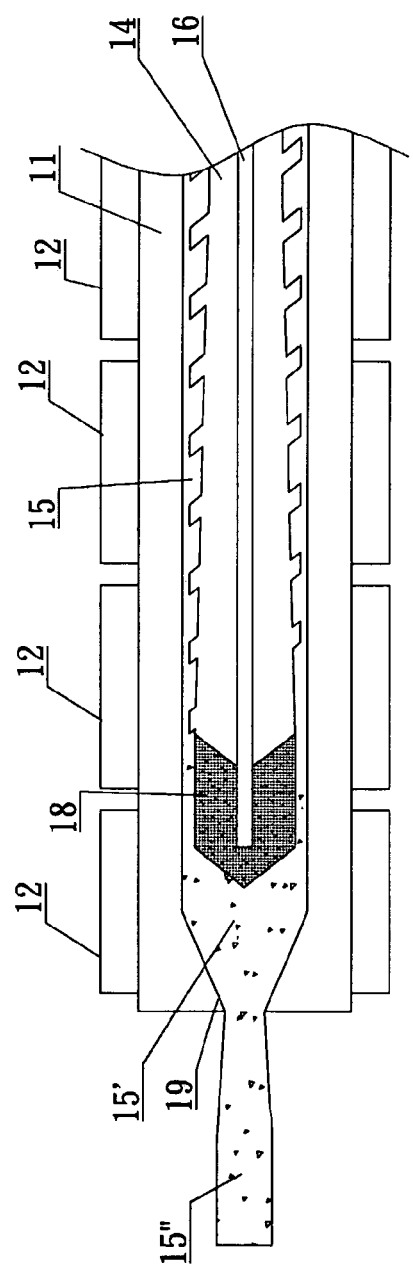

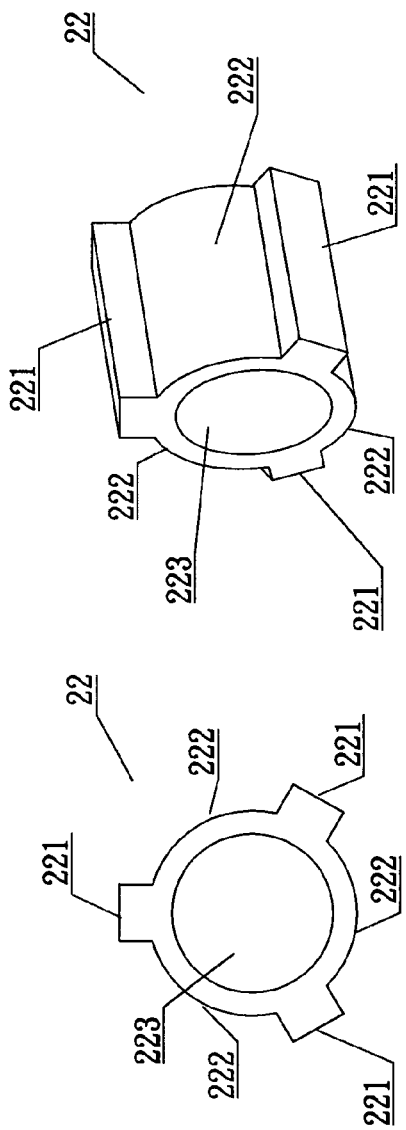
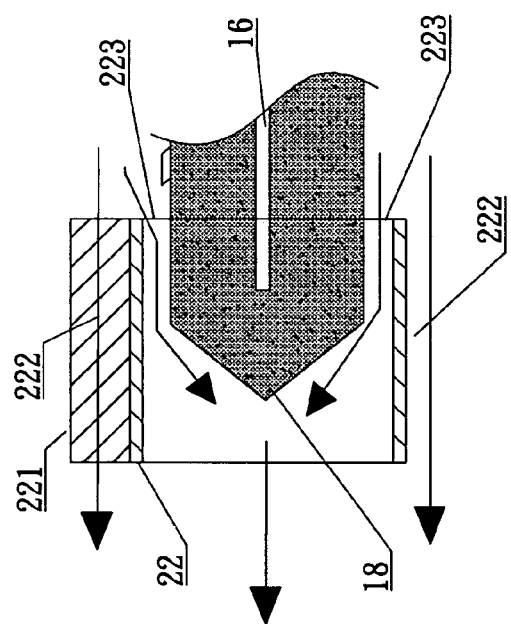
FIG. 5A
FIG. 5B
FIG. 5C

CONTROLLABLE MICROSCOPIC BUBBLE NUCLEATION IN FLUID POLYMER MATERIAL PRODUCTION METHOD AND ITS APPARATUS

BACKGROUND OF THE INVENTION

1) Field of the Invention

The invention herein relates to a controllable microscopic bubble nucleation in fluid polymer material production method and its apparatus consisting of a heater installed around a conveyance screw shaft that melts polymer material in a materials pipe, a gas pipe disposed in the conveyance screw shaft and, furthermore, a microbubble generating component (such as a microscopic perforation vented metal head or a microscopic perforation ceramic head, etc.) connected to the front extremity of the conveyance screw shaft, wherein by controlling whether the high pressure gas of a pressurization pump or a high pressure gas storage tank is transferred affords control over forming sections of liquid polymer material into the bubble nucleated or the non-bubble nucleated.

2) Description of the Prior Art

The polymer material utilized by conventional injection or extraction forming mechanisms is melted into a liquid, following which a physical foaming agent is added to the polymer material and after blending, the said polymer contains a foaming agent and unit cell amalgamation, the amalgamation is then injected into a forming die to harden, the pressure reduction enabling polymer unit cell growth in the amalgamation. However, the polymer material gives rise to a chemical reaction that produces a gaseous foaming agent, typically utilizing organic compounds, that under critical temperature characteristically decomposes and releases nitrogen, carbon dioxide, carbon monoxide, and other gases as bubble nucleation occurs in the liquid polymer. As such, approaches reflecting the said technology to promote nucleation in the liquid polymer such as patent application Ser. No. 87,104,336 (Microscopic Cell Perforation Material Injection Molding) utilize an injection molding or extraction mechanism with polymer as a raw material in which a liquid foaming agent is added into the said liquid polymer via the conveyance screw shaft, the said foaming agent then amalgamated at the conveyance screw shaft section, where the liquid polymer is blended and amalgamated, and admitted into the passage of a nucleation device from an accumulation chamber for pressure reduction such that the liquid polymer is rapidly nucleated; the said foaming agent utilizes solid or liquid carbon dioxide and the foaming agent enters the conveyance screw shaft section, the screw shaft blending the foaming agent with the liquid polymer material into an amalgamation that passes through an injection nozzle that enables the transfer of the said polymer material into the forming die for nucleation.

SUMMARY OF THE INVENTION

I. Problems Requiring Solution
  1. The polymer material nucleation obtained by the prior art polymer material nucleation method is incapable of a microscopic cell perforation dimensions of less than 35 microns using only a gaseous, liquid, or solid foaming agent because the bubbles produced are not uniform; a micron foaming material is required for such uniformity. However, the said micron foaming material is expensive high in cost, and offers little economic advantage.
  2. The deposition opening of the said foaming agent is situated at the outer edge of the materials pipe and is in continuity with the blending section of the conveyance screw shaft and, furthermore, adding in occurs at a set point, the foaming agent and liquid polymer material then blended and amalgamated by the conveyance screw shaft at the materials pipe section; however, before the liquid polymer material is blended, the foaming agent is introduced onto the surface of the melted polymer material and then blended, easily causing bubble run off and unevenness; furthermore, foaming agent and polymer material blending involves a lengthy foaming period and a slow rate that correspondingly increases cost.
  3. Heating in the materials pipe to melt the liquid polymer material, it is difficult to control the separation of the non-nucleated portion and nucleated portion at injection into the forming die and, furthermore, control over the required foaming agent percentage with the non-nucleated section is very problematic.
  4. A check valve must be installed at the said foaming agent deposition opening to prevent polymer material counter flow, but the device increases equipment costs and malfunction rates.

II. Solution Methods
  1. The invention herein utilizes a microbubble generating component (such as a microscopic perforation vented metal head or a microscopic perforation ceramic head, etc.) installed on a conveyance screw shaft and, furthermore, the said gas pipe is disposed in the interior section of the conveyance screw shaft and connected to the said microbubble generating component (such as a microscopic perforation vented metal head or a microscopic perforation ceramic head, etc.), enabling the delivery of gas through the gas pipe via a pressurization pump or a high pressure gas storage tank, with a heater at the outer edge of a materials pipe melting a polymer material, while indirectly pre-heating the gas pipe, such that microscopic bubbles are then outputted from the inside of irregularly arranged microscopic perforations of the microbubble generating component (such as a microscopic perforation vented metal head or a microscopic perforation ceramic head, etc.) which are widely distributed directly into the interior portion of the liquid polymer material, simultaneously blended and transferred by the conveyance screw shaft, and next injected into a forming die for lowering to critical temperature and pressure reduction as the polymer material is microbubble nucleated, thereby providing for simultaneous microbubble generation, blending, and transference to achieve the even distribution of microbubbles in the polymer material and, furthermore, the said microbubble nucleation dimensions are based on that of the microscopic perforations of the microbubble generating component 18 (such as a microscopic perforation vented metal head or a microscopic perforation ceramic head, etc.) to achieve the required size of less than 35 microns.
  2. The invention herein utilizes a microbubble generating component (such as a microscopic perforation vented metal head or a microscopic perforation ceramic head, etc.) installed at the front extremity of the conveyance screw shaft such that the said microscopic bubble supply section can be controlled to supply intermittently, enabling a clear demarcation of nucleated and non-nucleated polymer material injected into the forming die and, furthermore, the present invention is easy to control and further provides for adhesion of the non-nucleated polymer to the forming die surface, the said non-nucleated polymer material surrounding the microbubble nucleated polymer material at the interior section to thereby achieve a non-porous glossy surface encapsulating a microbubble nucleated interior section.

3. Since the microscopic perforations of the microbubble generating component in the invention herein are irregularly arranged outwardly from the inside, the polymer material does not have to flow into the microscopic perforations and, furthermore, clogging is precluded because the said conveyance screw shaft is at high temperature and melts the polymer material into liquid, with the microscopic bubbles forced out at high pressure such that a check valve is not required, reducing equipment cost and lowering malfunction rates.

The differentiated blending method of the microbubble nucleation in liquid polymer of the present invention is illustrated below and followed by the detailed description of the invention herein.

BRIEF DESCRIPTION OF THE DRAWINGS

FIG. 1 is a cross-sectional drawing of the first embodiment microscopic bubble generating component and the production method of the invention herein.

FIG. 1-A is a magnified drawing of the microscopic perforations in the surface of the first embodiment microbubble generating component of the invention herein.

FIG. 1-B is a cross-sectional drawing of the second embodiment microbubble generating component of the invention herein.

FIG. 1-C is a cross-sectional drawing of the third embodiment microbubble generating component of the invention herein.

FIG. 4 is a cross-sectional drawing of the extractor utilized for the nucleated polymer material forming method of the invention herein.

FIG. 5-A is an isometric drawing of the extractor flow diverter ring of the invention herein.

FIG. 5-B is an orthographic drawing of the flow diverter ring of the invention herein, as viewed from the front.

FIG. 5-C is a cross-sectional drawing of the flow diverter ring and the microscopic bubble produced component.

FIG. 6 is a cross-sectional drawing of the flow diverter ring sleeved on the micrbubble generating component along with the bubble nucleated and non-bubble nucleated polymer material separation structure and method.

DETAILED DESCRIPTION OF THE INVENTION

Figure 3:
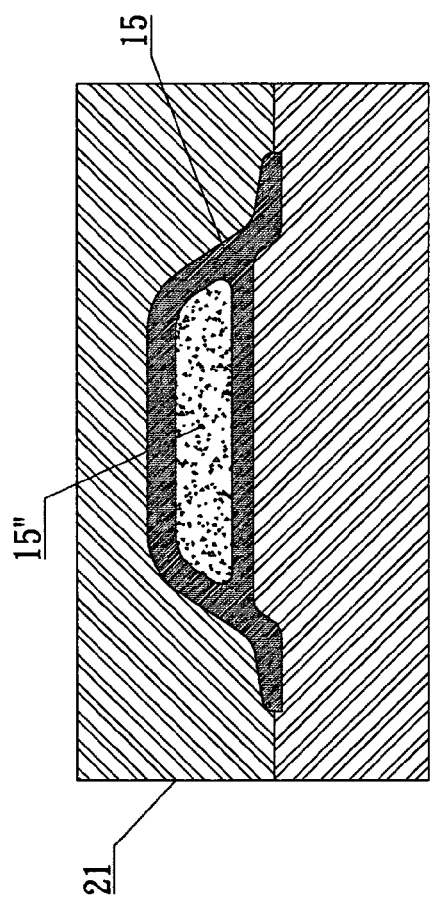
FIG. 3 is a cross-sectional drawing of the polymer material in FIG. 2 injected into the forming die as nucleated and non-nucleated.

The first embodiment of the invention herein, referring to FIG. 1 and FIG. 1-A, utilizes a materials pipe 11 inside an injector or an extractor 1 (1') having a heater 12 outside to melt polymer material 13 which is transferred and blended along a conveyance screw shaft 14, the molten liquid polymer material 15 thereby pushed forward; the said foaming source utilized involves the gaseous precipitation of a foaming reaction in the polymer material; a gas pipe 16 is disposed in the conveyance screw shaft 14, an air intake opening 17 is situated at the rear extremity and connected to a pressurization pump or a high pressure gas storage tank and, furthermore, a microbubble generating component 18 (such as a microscopic perforation vented metal head or a microscopic perforation ceramic head, etc.) is installed at the front extremity of the conveyance screw shaft 14; the said microbubble generating component 18 (such as a microscopic perforation vented metal head or a microscopic perforation ceramic head, etc.) has densely and irregularly arranged interconnected microscopic perforations disposed outward from the inside and, furthermore, the dimensions of the said microscopic perforations are brought to the required generated microbubble nucleating dimensions by replacing the microbubble generating component 18 (such as a microscopic perforation vented metal head or a microscopic perforation ceramic head, etc.) and attaching it to the said gas pipe 16 such that the gas pipe 16 and the microbubble generating component 18 (such as a microscopic perforation vented metal head or a microscopic perforation ceramic head, etc.) are connected together; as a result, referring to FIG. 4, high pressure gas from the pressurization pump or the high pressure gas storage tank travels through the air intake opening 17 into the gas pipe 16, the heater 12 around the materials pipe 11 melts the polymer material 13, while indirectly heating the conveyance screw shaft 14, exposing the interior of gas pipe 16 to heat, which is conducted into the microbubble generating component 18 (such as a microscopic perforation vented metal head or a microscopic perforation ceramic head, etc.), causing the output of the said hot gas to the exterior through the microscopic perforations from the inside, the said microscopic bubbles then directly admitted into the said section of liquid polymer material 15, the conveyance screw shaft 14 blends and mixes, while evenly amalgamating into a microbubble permeated polymer material 15' and transferring it into the material holding section 19 at the front extremity, thereby simultaneously achieving microscopic bubble generation, blending, and transferring such that the evenly amalgamated microbubble permeated polymer material 15' goes through an injection orifice 20 into the forming die 21 for depressurization and, furthermore, causing temperature to reach critical temperature such that when the polymer material hardens into shape, a microbubble nucleated polymer material 15" is produced, thereby providing for a nucleating method for evenly distributed microbubble nucleation throughout polymer material.

The said microbubble generating component 18 consists of densely and irregularly arranged microscopic perforations disposed outward from the inside; counter flow does not occur at the microscopic perforations along the surface and a check valve is not required, lessening malfunction rates and reducing production cost.

Figure 2:
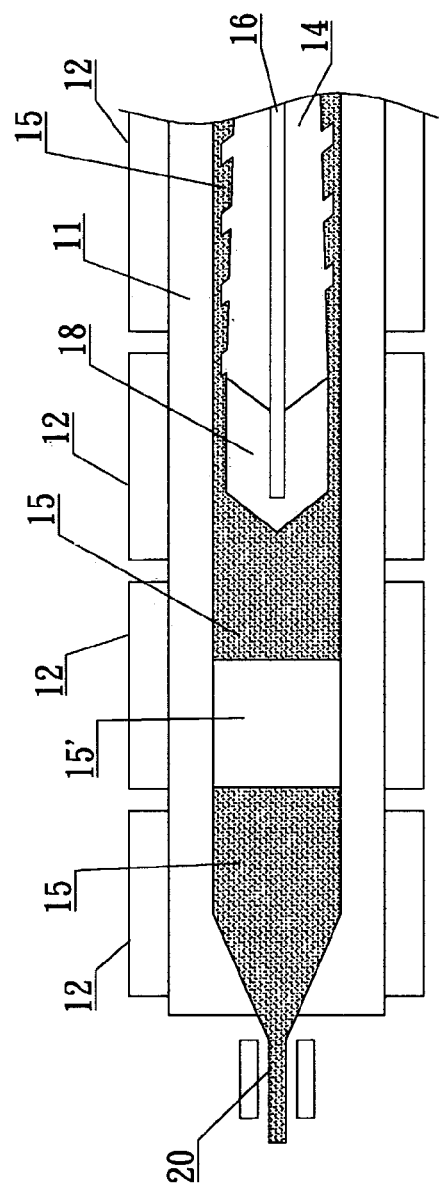
FIG. 2 is a cross-sectional drawing of the separately transferred microbubble permeated and non-microbubble permeated polymer material.

Referring to FIG. 2 and FIG. 3, the means of the said microbubble nucleation section control, gas conveyance or the termination thereof causes the microbubble generating component 18 (such as a microscopic perforation vented metal head or a microscopic perforation ceramic head, etc.) microscopic perforations to stop outputting microscopic bubbles, affording the option of either the intermittent supplying of gas or halting the supply such that the liquid polymer material 15 in the material holding section 19 provides microbubble permeated liquid polymer material 15' or non-microbubble permeated liquid polymer material 15 such that admission into the forming mold 21 is according to the said selectable continuous supply or intermittent supply of microbubbles, and the interior section has microbubble nucleated polymer material 15" or the entire body is a microbubble nucleated polymer material 15"; of course, the said microbubble generating component 18 can be connected to a suitable position of the conveyance screw shaft 14 for supporting the injection of the liquid polymer material 15 into the forming die 21 at a certain shaping volume.

In the preceding elaboration, as shown in FIG. 3, the non-microbubble permeated polymer material 15 is first injected into the forming die 21 and, according to the molding characteristics of the polymer material, the non-microbubble permeated polymer material 15 first adheres to the surface of the forming die 21 to form a glossy finish, following which the accompanying microbubble permeated polymer material 15' is injected into the forming mold 21 such that the non-microbubble permeated polymer material 15 surrounds the microbubble nucleated polymer material 15".

The second embodiment of the invention herein, referring to FIG. 1-B, consists of fabricating the microbubble generating component 18 into a solid metal component 18' mounted on the conveyance screw shaft 14; a gas passage 181' is horizontally disposed through the center that is in continuity with the gas pipe 16 inside the conveyance screw shaft 14 and, furthermore, a plurality of vent holes 182' are formed through the periphery of the solid metal component 18', the said vent holes 182' are in continuity with the gas passage 181' and a microscopic perforation vent block 183' is situated in each vent hole 182'; the said microscopic perforation vent block 183' and the first embodiment microbubble generating component 18 are of an identical material composition, enabling microscopic bubbles from the gas pipe 16 entering the gas passage 181' to respectively pass through the vent holes 182' such that microscopic bubbles are outputted from the microscopic perforations of the microscopic perforation vent block 183', thereby providing for the same performance as that of the said first embodiment.

The third embodiment of the invention herein, referring to FIG. 1-C, consists of fabricating the microbubble generating component 18 as a hollow metal component 18" such that an air chamber 184" is formed in the interior section and, furthermore, a through-hole 185" is disposed in the rear extent of the said hollow metal component 18" which is in continuity with the gas pipe 16 inside the said conveyance screw shaft 14 and, furthermore, a plurality of vent holes 182" are formed through the periphery of the hollow metal component 18", with a microscopic perforation vent block 183" is situated in each vent hole 182"; the said microscopic perforation vent block 183' and the first embodiment microbubble generating component 18 are of an identical material composition, enabling the entry of microscopic bubbles from the gas pipe 16 into the air chamber 184" such that microscopic bubbles are outputted from the microscopic perforations of the microscopic perforation vent block 183", thereby providing for same performance as that of the said first embodiment.

The fourth embodiment of the invention herein, referring to FIG. 5-A, FIG. 5-B, and FIG. 5-C, consists of an apparatus in which when the extractor is utilized to draw out the polymer material, the non-nucleated is maintained at the outer portion of the said extracted polymer material so that the surface is glossy and the nucleated is generated at the inner portion; a flow diverter ring 22 is sleeved onto the front end of the microbubble generating component 18 and ribs 221 are formed lengthwise along the outer edges of the said flow diverter ring 22 such that the height between the outer edges of the flow diverter ring 22 and the materials pipe 11 defined by the lengthwise ribs 221 form a non-microbubble permeated polymer material channel 222, while that between the inner edge of the flow diverter ring 22 and the microbubble generating component 18 form a microbubble permeated polymer material channel 223; as a result, referring to FIG. 5-C and FIG. 6, the said liquid polymer material 15 is pushed forward, a portion passing through the said non-microbubble permeated polymer material channel 222 and a portion admitted into the microbubble permeated polymer material channel 223 such that the non-microbubble permeated liquid polymer material 15 surrounds the microbubble permeated liquid polymer material 15' while being drawn out of the extraction orifice 224, the outer portion shaped as non-microbubble permeated liquid polymer material 15 and the inner portion shaped as microbubble nucleated polymer material 15", thereby providing for the encapsulation of the microbubble nucleated polymer material 15" by the non-microbubble permeated liquid polymer material 15.

In summation of the foregoing section, the invention herein provides for the formation of microscopic bubbles via gaseous mediums in liquid polymer material such that the polymer material becomes microbubble nucleated and, furthermore, directly amalgamating the microbubbles into the polymer material such that balanced microbubble nucleation occurs in the amalgamated polymer during constitution; the microscopic perforation dimensions of the microbubble generating component 18 (such as a microscopic perforation vented metal head or a microscopic perforation ceramic head, etc.) is selectable to provide for microbubble nucleation size, while the microscopic bubble output control provides for different sections of varying amalgamation to accommodate differing polymer material production requirements, with rapid and even nucleation to increase quality and, furthermore, the apparatus is simple in structure to reduce production costs; as such, the present invention meets the industrial utility and progressiveness requirements stipulated by the Patent Law and is submitted to the patent bureau for review and the granting of the commensurate patent rights.

The invention claimed is:

1. A controllable microscopic bubble nucleation in fluid polymer material production method and its apparatus consisting of an injection or extraction forming mechanism, utilizing gas as a foaming agent, and the said gas originates from a gaseous state source capable of precipitating foam to provide for the microbubble nucleation of polymer material, the microbubble nucleation methods of which are:

a. high pressure gas passes through a gas pipe in a conveyance screw shaft which is indirectly heated utilizing a heater at the outer periphery of a materials pipe;
  b. the said high pressure gas enters a microbubble generating component at the front extremity of the said conveyance screw shaft, enabling the gas to be evenly outputted as microscopic bubbles from inside irregularly arranged microscopic perforations;
  c. the said microscopic bubbles and the polymer material are blended and transferred by the said conveyance screw shaft to form a uniform, microbubble permeated polymer material; and,
  the injected or extracted microbubble permeated polymer material results from simultaneous microscopic bubble generation, blending, and transferring, providing for the rapid and even amalgamation of microscopic bubbles into the polymer material such that when the polymer material is shaped, it is a uniform, microbubble nucleated polymer material.

2. A controllable microscopic bubble nucleation in fluid polymer material production method and its apparatus consisting of a materials pipe of an injector or an extractor having a heater outside, with a conveyance screw shaft inside the said materials pipe to provide for polymer material melting and conveyance screw shaft transferring, the features of which are:

a gas pipe disposed in the interior section of the said conveyance screw shaft and, furthermore, an air intake opening is connected to a pressurization pump or a high pressure gas storage tank;

a microbubble generating component that consists of irregularly interconnected microscopic perforations disposed at the front extremity of said conveyance screw shaft, with the said gas pipe extending into the interior section of the said microbubble generating component;

as a result, the said microscopic bubbles are outputted from inside the irregularly arranged microscopic perforations of the said microbubble generating component and a check valve is not required to block counter flow, thereby simultaneously providing for the microscopic bubble generating, blending, and transferring of the liquid polymer material to achieve the rapid and uniform amalgamation of the microbubbles.

3. The method of claim 1 or claim 2, wherein the said microbubble generating component is a microscopic perforation vented metal head.

4. The method of claim 1 or claim 2, wherein the said microbubble generating component is a microscopic perforation vented ceramic head.

5. The method of claim 2, wherein the said high pressure gas is sourced from the said pressurization pump or the said high pressure gas storage tank.

6. The method of claim 1, wherein control over the said high pressure gas conveyance sources permits control of the said microbubble generating component microbubbles such that they are continuously outputted or intermittently outputted, enabling the liquid polymer material and microscopic bubble generating section to be intermittently amalgamated or continuously amalgamated, thereby providing for an injection or an extraction forming method.

7. The method of claim 1 or claim 2, wherein the said microbubble generating component provides a microscopic bubble measuring less than 35 microns, enabling polymer material nucleation at less than 35 microns.

8. The method of claim 1 or claim 2, wherein the said microbubble generating component is fabricated as a solid metal component; a gas passage is horizontally disposed through the center that is in continuity with the said gas pipe inside the said conveyance screw shaft 14 and, furthermore, a plurality of vent holes are formed through the periphery of the said solid metal component, the said vent holes are in continuity with the said gas passage and a microscopic perforation vent block is situated in each said vent hole, and the said microscopic perforation vent block also has irregular microscopic perforations.

9. The method of claim 1 or claim 2, wherein the said microbubble generating component is fabricated as a hollow metal component such that an air chamber is formed in the interior section and, furthermore, a through-hole is disposed in the rear extent of the said hollow metal component which is in continuity with the said gas pipe inside the said conveyance screw shaft and, furthermore, a plurality of vent holes are formed through the periphery of the said hollow metal component, a microscopic perforation vent block is situated in each said vent hole, and the said microscopic perforation vent block also has irregular microscopic perforations.

10. The method of claim 1 or claim 2, wherein the said microbubble generating component on the said extractor has a flow diverter ring sleeved onto its outer edge and ribs are formed lengthwise along the periphery of the said flow diverter ring such that the height between the outer edges of the said flow diverter ring and the said materials pipe defined by the lengthwise said ribs form a non-microbubble permeated polymer material channel, while that between the inner edge of the said flow diverter ring and the said microbubble generating component form a microbubble permeated polymer material channel such that the non-microbubble permeated liquid polymer material surrounds the microbubble permeated liquid polymer material.

11. The method of claim 4, claim 5, claim 8, or claim 9, wherein the said microbubble generating component has selectable microscopic perforation dimensions as well a microscopic perforation vented metal head and microscopic perforation ceramic head options to achieve required microscopic bubble nucleation dimensions.

* * * * *